United States Patent
Cecchin et al.

(10) Patent No.: US 10,691,994 B2
(45) Date of Patent: Jun. 23, 2020

(54) HANDHELD POWER TOOL AND AMPLIFIER ANTENNA

(71) Applicant: Hilti Aktiengesellschaft, Schaan (LI)

(72) Inventors: Holger Cecchin, Puchheim (DE); Markus Forstner, Landsberg (DE); Michael Fuchs, Bad Woerishofen (DE); Josip Matanovic, Dachau (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/077,144

(22) PCT Filed: Mar. 7, 2017

(86) PCT No.: PCT/EP2017/055293
§ 371 (c)(1),
(2) Date: Aug. 10, 2018

(87) PCT Pub. No.: WO2017/153389
PCT Pub. Date: Sep. 14, 2017

(65) Prior Publication Data
US 2019/0026619 A1    Jan. 24, 2019

(30) Foreign Application Priority Data
Mar. 10, 2016 (EP) .................................. 16159643

(51) Int. Cl.
*G06K 19/077* (2006.01)
*B25F 5/00* (2006.01)
*G06K 19/07* (2006.01)

(52) U.S. Cl.
CPC ............. *G06K 19/0776* (2013.01); *B25F 5/00* (2013.01); *G06K 19/0724* (2013.01); *G06K 19/07756* (2013.01); *G06K 19/07767* (2013.01)

(58) Field of Classification Search
CPC ......... G06K 19/0776; G06K 19/07767; G06K 19/07756; G06K 19/0724; B25F 5/00; H01Q 9/285; H01Q 1/22
(Continued)

(56) References Cited

U.S. PATENT DOCUMENTS 7,036,703 B2 *    5/2006   Grazioli ............. B25B 27/0085
                                                           227/10
8,487,769 B2 *    7/2013   Lindsay ............. G06K 19/0717
                                                           340/539.11
(Continued)

FOREIGN PATENT DOCUMENTS

CN         200965750         10/2007
CN         201278365          7/2009
(Continued)

*Primary Examiner* — Khai M Nguyen
(74) *Attorney, Agent, or Firm* — Davidson, Davidson & Kappel, LLC

(57) ABSTRACT

An electric handheld power tool, including a data memory and a data interface signal-connected to the data memory, via which tool-related data may be read out from the data memory with the aid of a terminal, the data interface including a system antenna for wireless radio data transmission, and the electric handheld power tool including an amplifier antenna which is different from the system antenna, the amplifier antenna being magnetically coupled with the system antenna and preferably mounted on or in the direct vicinity of the system antenna.

17 Claims, 3 Drawing Sheets

(58) Field of Classification Search
USPC .......................................................... 343/793
See application file for complete search history.

(56) References Cited

U.S. PATENT DOCUMENTS

| | | | |
|---|---|---|---|
| 9,367,062 B2* | 6/2016 | Volpert | .................. G05B 19/05 |
| 9,542,638 B2* | 1/2017 | Pavate | ............. G06K 19/07783 |
| 2008/0252446 A1* | 10/2008 | Dammertz | ................ B25F 5/00 |
| | | | 340/539.27 |
| 2009/0231139 A1 | 9/2009 | Heurtier et al. | |
| 2015/0340921 A1 | 11/2015 | Suda et al. | |
| 2017/0201295 A1 | 7/2017 | Kusakawa | |

FOREIGN PATENT DOCUMENTS

| | | |
|---|---|---|
| CN | 202205888 U | 4/2012 |
| JP | 2015226099 A | 12/2015 |

\* cited by examiner

HANDHELD POWER TOOL AND AMPLIFIER ANTENNA

The present invention relates to an electric handheld power tool, which includes a data memory and a data interface connected to the data memory signal, via which tool-related data may be read out from the data memory with the aid of a terminal.

BACKGROUND

Electric handheld power tools of the type mentioned at the outset are, in principle, known from the prior art. For example, operating data of the handheld power tool or errors occurring during operation in the form of error codes may be documented or stored in the data memory. These data may be read out and evaluated already during development as well as in the case of servicing or during maintenance of the handheld power tool.

SUMMARY OF THE INVENTION

It is an object of the present invention to provide an electric handheld power tool, which facilitates a comfortable and secure reading out of the data memory.

The present invention provides a data interface is designed for wireless data transmission. For the purpose of wireless data transmission, the data interface includes a system antenna, and the electric handheld power tool includes an amplifier antenna, which is different from the system antenna and is magnetically coupled with the system antenna. The amplifier antenna is preferably mounted on or in the direct vicinity of the system antenna.

The present invention includes the finding that a reading out of the data memory in electric handheld power tools according to the prior art usually takes place via an optical or wired interface (e.g. a USB port). To be able to read out an electric handheld power tool via data interfaces of this type, the electric handheld power tool must be connected to a mains supply (power outlet). Alternatively, in the case of a battery-operated handheld power tool, the data interface must be supplied via an auxiliary supply, which typically occurs to the significant detriment of the lifetime of a handheld tool battery.

It has also been recognized as disadvantageous that optically designed interfaces are very sensitive to contamination and mechanical damage. Battery-operated handheld power tools according to the prior art disadvantageously also require a cumbersome adapter for exchanging data, which makes it more difficult to handle the handheld power tool.

An avoidance of these described disadvantages is favored with the aid of the handheld power tool according to the present invention.

Due to the fact that the data interface is designed for wireless radio data transmission and includes an amplifier antenna in addition to the system antenna, which is magnetically coupled with the system antenna, a data exchange connection is implemented, which is both robust and has a great range. A data transmission may now take place, for example when the power tool is still in the handling device (for example a toolbox). The handheld power tool located in the toolbox may now be easily brought into the vicinity of a communication terminal, so that tool-related data may be easily exchanged.

In this regard, the present invention includes the finding that, in addition to the pure requirements of robustness, increased requirements of range, cost and the necessary installation space also exist. Physical limitations of a wireless radio interface are determined by the available installation space and the surroundings of the system antenna. A direct relationship between volume and range thus exists. Due to the fact that a magnetically coupled amplifier antenna is provided in addition to the system antenna, it is now made possible that not only the magnetic near field of the system antenna but also the electromagnetic far field of the amplifier antenna are usable for the ranges of increased data transmission.

In one particularly preferred embodiment, the amplifier antenna includes a dipole and an inductive coupling loop. The dipole and coupling loop are preferably designed as a wire, forming a single piece with each other.

It has been proven to be advantageous if the system antenna is designed as a PCB antenna. The system antenna, for example in the form of the PCB antenna, may be part of an RFID tag (transponder) together with the data memory.

It has been proven to be advantageous if the dipole is designed as a symmetrical $\lambda/2$ dipole, with respect to a tuning frequency of the data interface. Alternatively, the dipole may be designed as an asymmetrical $\lambda/4$ dipole having a terminating element with respect to a tuning frequency of the data interface. It has been proven to be advantageous if the data interface is tuned to an RFID UHF range, for example on the 433 MHz band.

In one particularly preferred embodiment, the amplifier antenna is encompassed by a self-adhesive label. The amplifier antenna is preferably provided on the label as a metallization layer. The handheld power tool may thus be particularly easily provided with the amplifier antenna, in particular subsequently, and the range of the system antenna is thus increased. The label or the amplifier antenna is preferably situated or is to be situated on a housing, in particular an outer housing, of the handheld power tool. The label and the amplifier antenna may also be situated within a housing of the handheld power tool.

It has been proven to be advantageous if the data memory is part of control electronics of the handheld power tool. The electric handheld power tool may be configured in such a way that, for example, a new (higher or lower) threshold value may be defined for the total discharge of a handheld power tool battery. This is advantageous, in particular, in newly developed battery types.

In another preferred embodiment, the electric handheld power tool includes a power tool battery provided for supplying electric power to the handheld power tool. The data interface may be supplied with power by the power tool battery. Alternatively or additionally, the data interface may be supplied with power exclusively via the system antenna and the amplifier antenna magnetically coupled with the system antenna.

The present invention provides a self-adhesive label for gluing onto a housing of an electric handheld power tool. The label includes an amplifier antenna having a dipole and an inductive coupling loop, the dipole and the coupling loop preferably being provided on the label as a metallization layer, forming a single piece with each other. The self-adhesive label may be refined by the features already described above with respect to the electric handheld power tool.

The present invention also provides the use of a dipole having an inductive coupling loop formed thereon as a single piece in the form of an amplifier antenna for a wireless data interface of an electric handheld power tool. The amplifier antenna is preferably provided as a self-adhesive label for gluing onto a housing of an electric handheld power tool. With respect to the use, the present invention may be correspondingly refined by the features described with respect to the electric handheld power tool or the features described with respect to the self-adhesive label.

BRIEF DESCRIPTION OF THE DRAWINGS

Other advantages result from the following description of the figures. The figures illustrate different exemplary embodiments of the present invention. The figures, the description and the claims contain numerous features in combination. Those skilled in the art will advantageously also consider the features individually and combine them to form other meaningful combinations.

In the figures, identical and equivalent components are provided with identical reference numerals.

DETAILED DESCRIPTION

Figure 1:
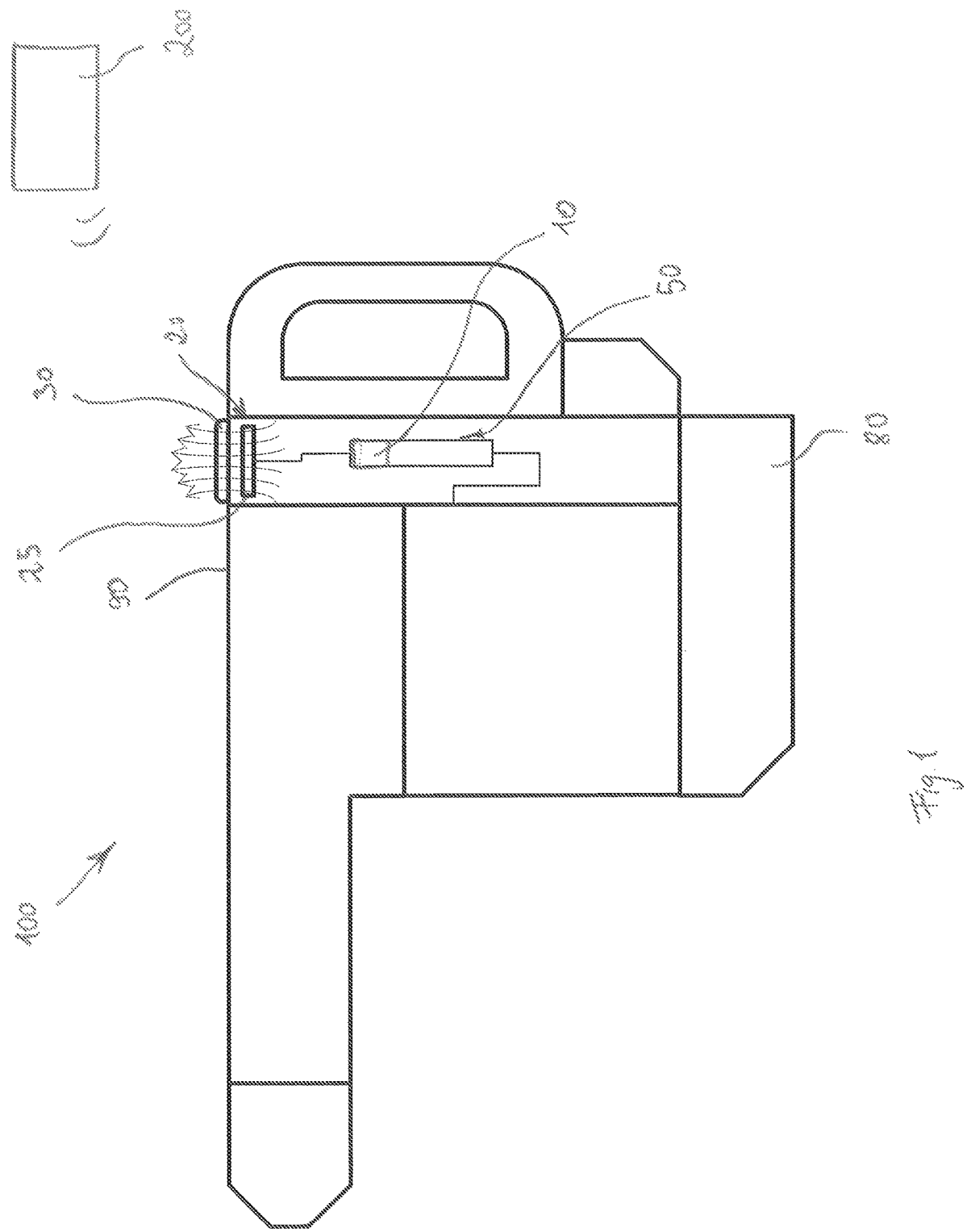
FIG. 1 shows an exemplary embodiment of a handheld power tool according to the present invention.

FIG. 1 shows an electric handheld power tool 100, including a data memory 10 and a data interface 20 signal-connected to data memory 10. Data memory 10 is part of control electronics 50 of handheld power tool 100.

A terminal 200 is apparent on the right side of FIG. 1, with the aid of which tool-related data may be read out from data memory 10 and via data interface 20.

For the purpose of wireless data transmission, data interface 20 includes a system antenna 25, here in the form of a PCB antenna by way of example.

The handheld power tool furthermore includes an amplifier antenna 30, which is provided in addition to system antenna 25. In the present illustrated exemplary embodiment, amplifier antenna 30 is mounted in the direct vicinity of system antenna 25. In the illustrated exemplary embodiment, amplifier antenna 30 is encompassed by a self-adhesive label, which in the present case is glued onto a housing 90 of handheld power tool 100.

Within the scope of the present invention, an arrangement in the direct vicinity of the system antenna is understood to be an arrangement of the amplifier antenna, in which the system antenna is magnetically coupled with the amplifier antenna.

In the exemplary embodiment in FIG. 1, data memory 10 is part of control electronics 50 of handheld power tool 100. Accordingly, for example, tool-related data in the form of control parameters for the control electronics may be wirelessly transmitted by radio from terminal 200 to handheld power tool 100.

As is also apparent in FIG. 1, electric handheld power tool 100 includes a power tool battery 80. This tool battery 80 is provided for supplying electric power to handheld power tool 100 and, in the present exemplary embodiment, is not used for supplying electric power to data memory 10. Instead, data memory 10 is supplied with power solely by electromagnetic energy, which is transmitted from terminal 200 to amplifier antenna 30 and system antenna 2.

Figure 2:
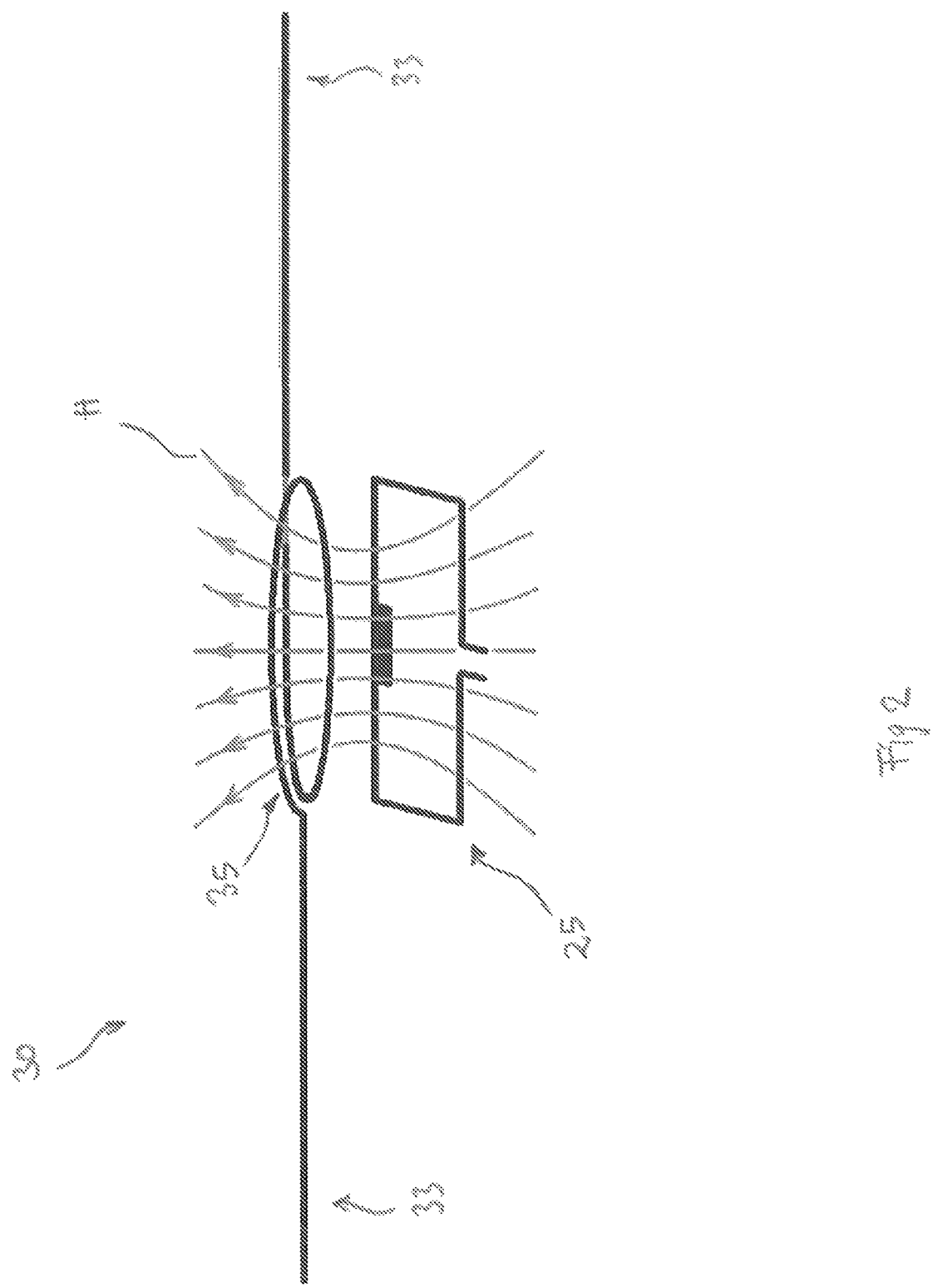
FIG. 2 shows a system antenna, including a magnetically coupled amplifier antenna.

FIG. 2 now schematically shows a system antenna 25 in the form of a PCB antenna. An amplifier antenna 30 is illustrated above system antenna 25.

Amplifier antenna 30 includes a dipole 33 and an inductive coupling loop 35. Dipole 33 and coupling loop 35 are designed as a wire forming a single piece with each other.

Amplifier antenna 30 is magnetically coupled with system antenna 25 via coupling loop 35. This is indicated by the H field.

With the aid of the arrangements shown in FIG. 2, it is possible to receive not only the magnetic near field but also the electric far field, due to the design of dipole 33, and to magnetically couple them into system antenna 25 provided as PCB antenna via coupling loop 35.

For example, dipole 33 is designed as a symmetrical $\lambda/2$ dipole.

Figure 3:
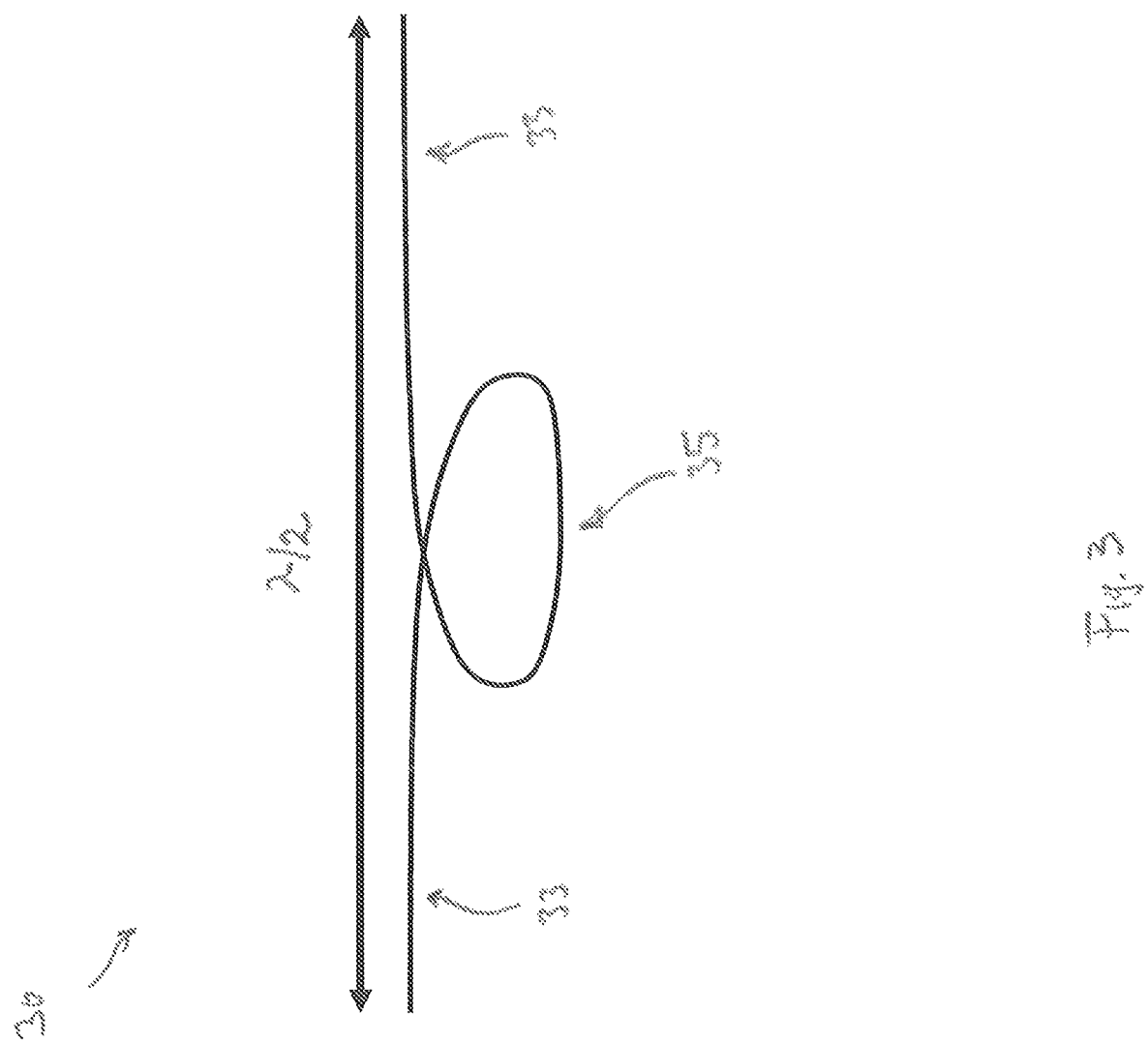
FIG. 3 shows an exemplary embodiment of an amplifier antenna.

Finally, FIG. 3 shows amplifier antenna 30 which includes a symmetrical $\lambda/2$ dipole and an inductive coupling loop 35, the dipole and coupling loop 35 being designed as a wire, forming a single piece with each other. The amplifier antenna shown in FIG. 3 may be encompassed, for example, by a self-adhesive label, which is to be glued or is glued onto a housing 90 of an electric handheld power tool 100 (cf. FIG. 1). In its simplest form, according to FIG. 3, amplifier antenna 30 is used within the scope of use according to the present invention as an amplifier antenna 30 for a wireless interface 20 and its system antenna 25 (cf. FIGS. 1 and 2).

LIST OF REFERENCE NUMERALS 10 data memory
20 data interface
25 system antenna
30 amplifier antenna
33 dipole
35 coupling loop
50 control electronics
80 power tool battery
90 housing
100 hand-held power tool
200 terminal

What is claimed is:

1. An electric handheld power tool comprising:
a data memory and a data interface signal-connected to the data memory, tool-related data readable out from the data memory via the data interface with the aid of a terminal, and, for the purpose of wireless radio data transmission, the data interface including a system antenna; and
an amplifier antenna different from the system antenna, the amplifier antenna being magnetically coupled with the system antenna.

2. The electric handheld power tool as recited in claim 1 wherein the amplifier antenna is mounted on or in a direct vicinity of the system antenna.

3. The electric handheld power tool as recited in claim 1 wherein the amplifier antenna includes a dipole and an inductive coupling loop.

4. The electric handheld power tool as recited in claim 3 wherein the dipole and the coupling loop are designed as a wire, forming a single piece with each other.

5. The electric handheld power tool as recited in claim 1 wherein the system antenna is designed as a PCB antenna.

6. The electric handheld power tool as recited in claim 3 wherein the dipole is designed as a symmetrical $\lambda/2$ dipole or an asymmetrical $\lambda/4$ dipole having a terminating element, with respect to a tuning frequency of the data interface.

7. The electric handheld power tool as recited claim 1 wherein the data interface is tuned to an RFID UHF range.

8. The electric handheld power tool as recited in claim 1 wherein the amplifier antenna is encompassed by a self-adhesive label.

9. The electric handheld power tool as recited in claim 8 wherein the amplifier antenna is provided on the label as a metallization layer.

10. The electric handheld power tool as recited in claim 1 wherein the data memory is part of control electronics of the handheld power tool.

11. The electric handheld power tool as recited in claim 1 further comprising a power tool battery for supplying electric power to the handheld power tool, the data interface being supplied with power by the power tool battery or the system antenna.

12. The electric handheld power tool as recited in claim 1 wherein the amplifier antenna is magnetically coupled to the system antenna via an H field.

13. The electric handheld power tool as recited in claim 1 wherein system antenna defines a magnetic near field, and the amplifier antenna defines an electromagnetic far field larger than the magnetic near field.

14. The electric handheld power tool as recited in claim 1 wherein system antenna and the amplifier antenna each transmit the tool-related data.

15. A self-adhesive label for gluing onto a housing of an electric handheld power tool, the label comprising an amplifier antenna having a dipole and an inductive coupling loop.

16. The label as recited in claim 15 wherein the dipole and the coupling loop are designed as a wire, forming a single piece with each other.

17. A method for operating an electric handheld power tool comprising: using a dipole, including an inductive coupling loop formed thereon as a single piece, as an amplifier antenna for a wireless data interface of an electric handheld power tool.

\* \* \* \* \*